REVERSIBLE VACUUM HUB TAPE REEL

Filed Oct. 24, 1965 2 Sheets-Sheet 1

Inventors:
Gordon E. Bradt
Norman R. Kubnick
George B. Shields
By Barry L. Clark
John E. Peele Jr.
Attys.

REVERSIBLE VACUUM HUB TAPE REEL

Filed Oct. 24, 1965 2 Sheets-Sheet 2

Inventors:
Gordon E. Bradt
Norman R. Kubnick
George B. Shields.
By Barry L. Clark
John E. Peele Jr. Attys United States Patent Office 3,326,491

Patented June 20, 1967

3,326,491

REVERSIBLE VACUUM HUB TAPE REEL

Gordon E. Bradt, Wilmette, Norman R. Kubnick, Skokie, and George B. Shields, Morton Grove, Ill., assignors to Bell & Howell Company, Chicago, Ill., a corporation of Illinois Filed Oct. 24, 1965, Ser. No. 504,430

14 Claims. (Cl. 242—74)

The present invention relates to tape handling. Particularly the invention relates to means for anchoring the lead end of a tape segment from a supply source on a take-up reel or the like. Specifically the invention relates to means for pneumatically anchoring the lead end of a tape section on a take-up reel.

For handling tapes such as those of the character employed with a magnetic tape recorder-reproducer assembly, various pneumatic mechanisms have heretofore been known. Each is adapted automatically to thread tape from a tape supply reel through the operative mechanism of a magnetic recorder-reproducer assembly and onto a tape take-up reel. While each of the prior mechanisms have solved some problem in connection with the pneumatic handling of tape, none has been developed to an adequate level of sophistication as regards anchoring the first convolution of the lead end of a tape section on a take-up reel to gain wide commercial acceptability. Essentially, the shortcoming arises from failure, heretofore, of those concerned with product development in the present art to give sufficient attention to facets of the problem solution of which tends toward consumer acceptance.

Conventionally, each of the most recent tape take-up mechanisms of the class with which the present invention concerns itself has a tape take-up reel characterized by a hub with a channeled outer annular wall. The wall outwardly defines a chamber adapted for connection to pneumatic means for reduction of pressure within the hub to cause anchoring of the first convolution of the lead end of a tape segment on the surface of the hub by external pressure.

The structural detail of one of the prior tape take-up reels is such that it can be operated for tape take-up only from a single attitude. That is to say, one side of the reel must always be outermost and its other side must always address the air pressure reduction source because it is not adapted to be used in an inverted position. While such prior reel may also be employed as a supply reel in a magnetic tape recorder-reproducer assembly, another prior tape take-up reel is constructed in a manner such that it is neither adapted for removal from the take-up spindle nor employable as a supply reel and only can operate in a device having a bi-directional drive.

Although the aforesaid limitations tend to minimize enjoyment of said prior tape take-up mechanisms, another factor reducing their potential employment arises from their failure to provide means by which their reels can be used to take up tape by mechanically anchoring the lead ends of tape segments in a conventional manner. Such omission is significant because of the evident limitation of use which it causes.

It is the principal object of the present invention to provide, in a pneumatic tape take-up reel mechanism, means for anchoring the lead end of a tape segment on a tape take-up reel under a wide range of operative conditions to satisfy commercial requirements.

To that end, and as a further object of the invention, an improved removably mounted tape take-up reel is provided having means for uniformly pneumatically and transversely gripping the first convolution of a tape segment on the hub of said take-up reel.

As another object of the present invention means are provided by reason of which the pneumatic tape gripping mechanism is arranged in the reel in a manner such that the reel is adapted to anchor the first convolution of the lead end of a tape in each position of reel inversion. Thereby, the reel may function effectively for tape take-up when inverted by design or inadvertence.

Moreover, it is an object of the invention to provide means in a pneumatic tape take-up reel for mechanically anchoring the lead end of a tape section on the hub of said reel whereby use of the reel is not limited to a recorder or reproducer having pneumatic means to reduce air pressure in the reel hub.

Briefly described, the invention comprises a tape take-up reel which has inevertible means for applying reduced pressure or suction against the inner surface of the first convolution of a tape segment to anchor the same concentrically on the hub of said reel. Such construction permits employment of the reel for tape take up in both positions of angular reel inversion about an axis normal to the rotational axis of such reel. Preferably, the utility of the invention is achieved by arranging the components of the pressure reducing means inversely symmetrically.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

Figure 1:
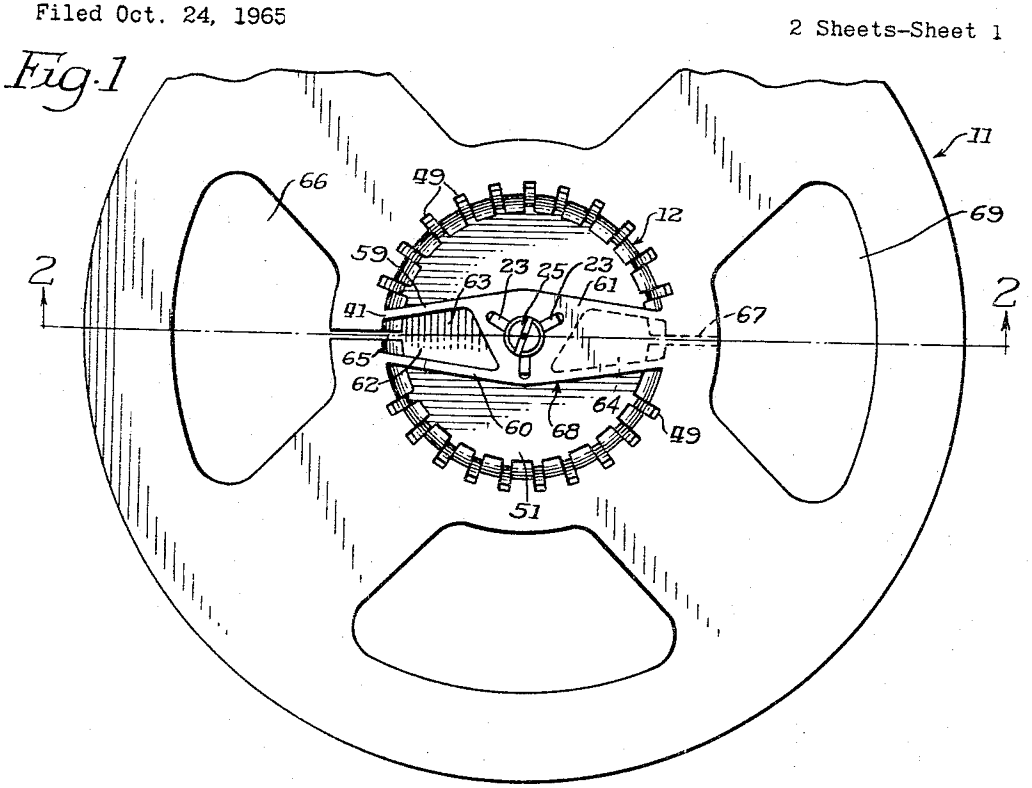
FIG. 1 is a top plan view of a take-up reel embodying one form of the present invention, part of the take-up reel being broken away in the interest of conservation of drawing area.

Initially, attention is invited to the use throughout the description of direction denoting terms such as "up," "down," "vertical," "horizontal" and the like. Such terms are not intended as limitations upon the invention, but are employed for the purpose of illustration by orientation, which shall be herein had, with reference to direction as they appear when considered from FIGS. 2 and 4.

Referring now more particularly to the drawings, there is illustrated a tape reel generally designated 11 and of the type adapted for a strip of material such as tape used in a magnetic recorder-reproducer assembly. The reel has a cavernous central portion or hub 12 outwardly bounded by a vertical wall 41 which is concentric with the rotational axis of said reel and toward which the lead end of a tape segment from a supply source (not shown) may be driven or moved in any conventional manner well known in the art. The reel 11 together with its hub 12 are mounted for rotation by an assembly which is generally designated 13 and which includes a drum 14 through the hub 15 of which there is projected a drive spindle or shaft 16 which is constrained for rotation with a shaft extension 17.

A reel platform or support 18, the lower end portion 19 of which is arranged about the upper end ring-like flange 31 of the drum 14, is constrained for rotation with the shaft 16. For that purpose in the illustrated embodiment, the shaft extension 17 is suitably secured by any suitable means, such as by press fit, to the hub 21 of said reel support. The reel support hub 21 has an upwardly projected extension 22 which is fashioned with a plurality of vertical radially extending keys or splines 23 which are received in keyways 24 defined in the central portion of the hub 12. Thereby, reel 11 is removably mounted on said reel support 18 with which said reel is adapted to be driven by the drive shaft 16.

To facilitate mounting of reel 11 on its support 18, a vertical extension member in the form of a screw having an elongated cap 25 can be threaded into the upper end of the shaft extension 17. The cap 25 provides a spindle-like projection about which the hub 12 is removably mounted, said cap being proportioned to project above the reel when the same is operatively conditioned.

Figure 2:
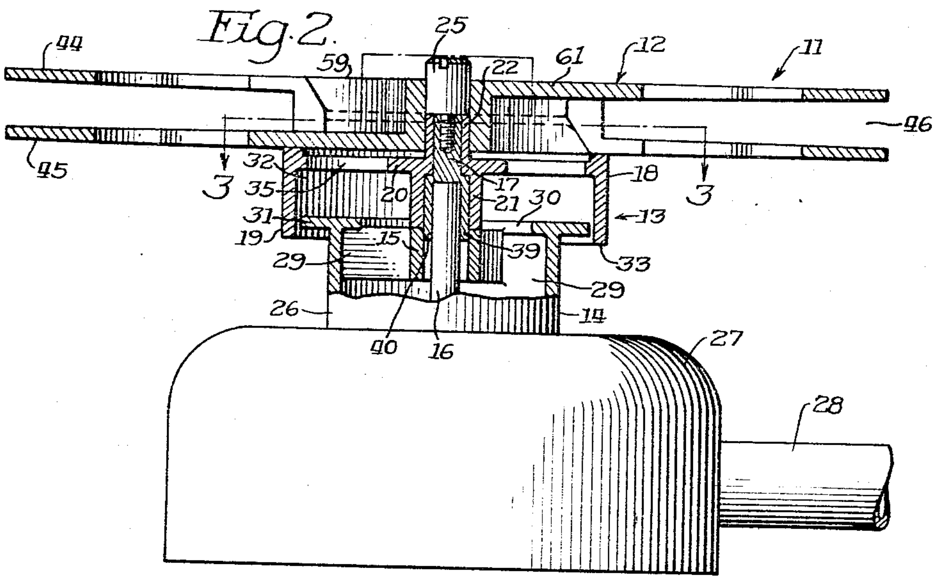
FIG. 2 is a vertical sectional view through said reel taken substantially on the line 2—2 of FIG. 1 looking in the direction of the arrows and illustrating the reel operably mounted with respect to reel support, drive and pressure reduction means.

As illustrated in FIG. 2, the drum 14 has a body defined by an imperforate circumferential wall 26 which is arranged in air transmission association with a casing 27 which houses a mechanism (not shown) for motivating the drive shaft 16. The casing 27 is connected in air transmission association to a partial vacuum or suction generating means (not shown) by any suitable member such as a conduit 28, only a portion of which is shown to the right of FIG. 2. Thereby, there may be developed within the casing 27 suction bias which can be impressed through the hub 12 upon the first coil or convolution of a tape segment (not shown) to be wound about said hub.

To that end, drum 14 of the exemplary embodiment has therein a plurality of vertical upwardly opening passages 29. As illustrated in FIG. 2, the ring-like flange 31 which limits the upper end of the drum 14 defines upper drum openings 30 through which the passages 29 are in pneumatic connection with a reel support chamber 32 in which the drum flange 31 is disposed, said flange 31 shown as being spaced above the lower margin 33 of said reel support 18.

As clearly illustrated in FIG. 4, medially of the reel support hub 21 and its upward extension 22 is an integral horizontal reel support hub flange 20 which is spaced slightly below the upper margin 34 of said reel support 18. A plurality of radial arms or spokes 35 which are disposed in a substantially horizontal plane extend outwardly from the hub flange 20 to the outer wall defining the reel support 18. The foregoing arrangement generates an annular chamber 36 within the reel support 18 about the reel support hub extension 22. The chamber 36 may be considered as being limited from below by the reel support hub flange 20 and the radial arms or spokes 35 which define therebetween a plurality of openings 37 through which the chamber 36 and the chamber 32 are communicatively connected. Perimetrically, the chamber 36 is bounded by an annulus 38 which comprises an upward extension of the wall defining the reel support 18.

While the reel support 18 and the drum 14 might be constrained for rotation together, without intention to limit the present invention, in the illustrated embodiment said reel support is mounted for rotation relative to the drum 14. To the end that the reel support 18 and the drum 14 are suitably arranged for relative rotation, as illustrated in FIG. 2, the lowermost part of shaft extension 17 constitutes a depending sleeve 39 which extends about and is constrained for rotation with said shaft 16. Said sleeve has a lower end portion 40 which serves as an anti-friction bearing which is proportioned with its outer diameter substantially the same as the inner diameter of the hub 15 of said drum 14 into which said lower end portion 40 projects in journalled association.

Figure 4:
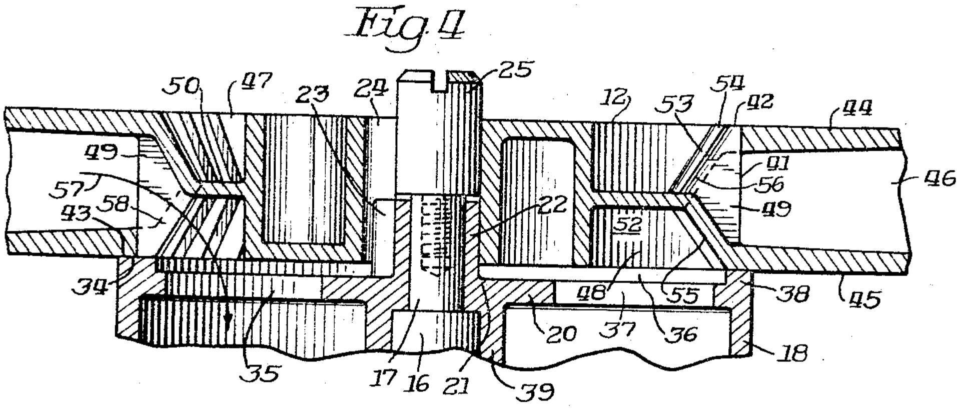
FIG. 4 is a vertical sectional view taken along the line 4—4 of FIG. 3 and looking in the direction of the arrows and showing the details of construction of the hub of the take-up reel, portions of said support and drive means and the pressure reduction means being omitted.

The hub 12 has upper and lower annular rim sections 42 and 43 respectively which are co-extensive with upper and lower reel flanges 44 and 45, respectively, as illustrated in FIG. 4. Thereby, an annular pocket 46 is defined between said reel flanges which is bounded inwardly by the outer surface of the wall 41 against which the first convolution of the lead end of a tape segment (not shown) can be secured in accordance with the teachings of the present invention. To such end, the hub rims 42 and 43 define in the upper and lower hub faces a pair of hub end openings 47 and 48 which are adapted alternately to be disposed in air transmission association with the chamber 36.

For the latter purpose, the hub 12 has an invertible or inverse symmetry longitudinally of its axis of rotation and is removably mounted on the splines 23 for inverse conditioning about an axis normal to the rotational axis of said reel. Accordingly, the reel flanges 44 and 45 may alternately serve as upper and lower members. When the reel 11 is employed in a manner such that the flange 45 is the lower thereof, the lower hub rim portion 43 seats against the upper surface 34 of the annulus 38 as illustrated in FIG. 4. Upon inversion however, the hub rim portion 42 will seat against the annulus 38. In the former instance, the cavernous interior of the hub 12 will be in air transmission association with the reel support chamber 36 through the hub opening 48, whereas, in the latter instance, the cavernous interior of hub 12 will be in air transmission association with said reel support chamber through the hub end opening 47.

The wall 41 which defines the hub 12 has a plurality of channels 49 which are spaced apart from each other circumferentially of such hub and extend transversely of the circumference of said wall 41 substantially its entire height. As illustrated in FIG. 4, a plate 50 which serves as a baffle is disposed normally to the rotational axis of said hub midway between the outer rims 42 and 43. The plate 50 divides the cavernous interior of the hub 12 into a pair of inversely symmetrical chambered or cellular sections 51 and 52, said plate 50 at its perimeter being fashioned integrally with the inner surface 53 of the wall 41.

As illustrated in FIG. 4, the inner surface 53 of the wall 41 is angular in cross section having a pair of oppositely conically sloping sections 54 and 55 projected from the plate 50 outwardly toward the outer surface of the wall 41.

In the embodiment illustrated in the drawings, each of the channels 49, not all of which have been numbered in each of the views, open to the outer surface of the wall substantially its entire height. However, each of the channels 49 does not open along the entire of the inside surface 53 of the wall 41. Rather every other channel 49 opens through the wall surface 54 into the chamber 51, while alternate channels 49 open through the wall surface 55 into the chamber 52.

Figure 3:
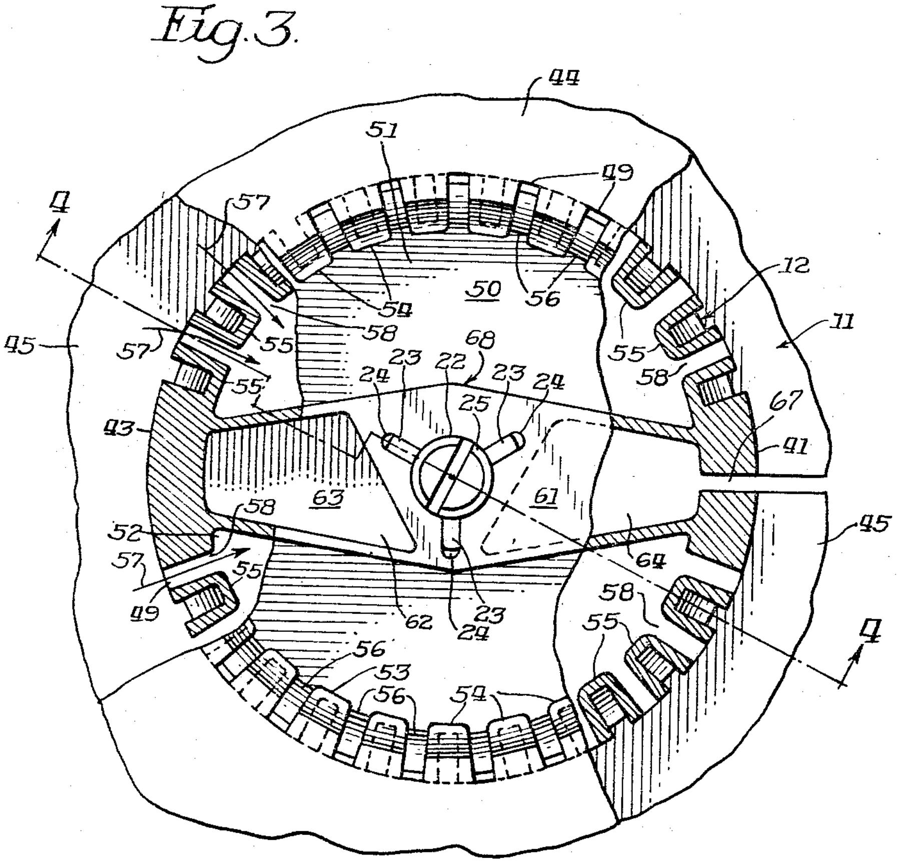
FIG. 3 is an enlarged composite view taken on various horizontal planes along the line 3—3 of FIG. 2 and looking in the direction of the arrows.

Arrangement of the components of hub 12 will also be appreciated by referring to FIG. 3 in the center portion of which the plate or baffle 50 is shown in plan with said baffle defining the bottom of the chambered section 51. The inner wall surface 54, only several sections of which have been numbered in FIG. 3, has inwardly opening channel portions 56 only some of which have been numbered in FIG. 3. Channel portions 56 are in communicative connection with or extensions of every other channel 49 whereby every other channel 49 is in air transmission communication with said chambered section 51. Alternate of the channels 49 which open into the chambered section 52 are shown in dotted lines in the center of FIG. 3. Such alternate channels are shown in solid lines to the left and right of FIG. 3, which is a view looking into chambered section 52 downwardly from the bottom of the plate 51, it being indicated by arrows 57 that communicative connection is established between such alternate channels 49 and the chamber 52 through channel portions 58 which extend through the inner wall surface 55.

By reason of the foregoing construction, when pressure is reduced within the hub 12 by reason of operation of the pneumatic means heretofore described, such reduced pressure effect will be impressed only in one of the chambered sections 51 and 52 depending on which is mounted for air transmission association with the chamber 36. Accordingly, only half of the channels 49 will be effective for reducing pressure along the inner surface of the first convolution of the lead end of a tape (not shown) which will be impinged against the outer surface of the wall 41 by reason of external pressure.

While the dimension of the openings of channels 49 in the exterior surface of the wall 41 might be made shorter, more uniform and maximized tape gripping is effectuated in each position of hub inversion if the height of such openings is substantially the same as the height of the wall 41.

To the end that use of reels embodying the present invention is not limited to devices having pneumatic tape handling mechanisms, the hub 12 may be modified to provide for mechanically anchoring thereon the lead end of a tape segment to be wound on the reel. Such provision comprises a diametrically disposed island structure generally designated 68 and preferably fashioned integrally with said hub 12, as illustrated in FIGS. 1 and 3. The island structure 68 comprises a pair of opposite vertical walls 59 and 60 the height of which is substantially equal to the height of the hub 12, said walls 59 and 60 at their outer ends merging with the hub wall 41. The disposition of the island structure 68 is such that it divides each of the chambered sections 51 and 52 into a pair of cells the disposition of which is evident by having reference to the drawings.

The walls 59 and 60 are covered from the top by an integral plate 61 which is disposed in the plane of the hub rim 42. The cover 61 extends from the hub wall 41 to a position beyond the center of the hub, said cover 61 being proportioned to provide at the end thereof a chamber 62 between the uncovered portions of the walls 59 and 60. The chamber 62 has a floor 63 which is the inverse symmetrical counterpart of the cover 61. Said floor 63 is fashioned preferably integrally with the walls 59 and 60 and extends from the wall 41 beneath the chamber 62 to a position beyond the center of said hub 12, said floor 63 being proportioned to provide under the cover 61 a downwardly opening cell or chamber 64 which is the inverse counterpart of the chamber 62.

A bore or suitably fashioned opening which defines the spline slots or keyways 24 extends through the center parts of said cover 61 and floor 63 whereby the hub 12 is removably mountable on the axis extension 22 in a manner heretofore described.

Between one end of the walls 59 and 60, a slot 65, extending vertically substantially the height of hub 12, is formed in the wall 41 above the floor 63. The slot 65 horizontally extends through the reel flange 44 to communicatively connect island cell or chamber 62 to a conventional opening 66 provided in the reel flange 44. The slot 65 does not extend through the floor 63. At the other end of the walls 59 and 60, a slot 67, extending vertically substantially the height of hub 12, is formed through the wall 41 below the cover 61. Said slot 67 horizontally extends through the reel flange 45 to communicatively connect the chamber 64 with a conventional opening 69 formed in said reel flange 45. By reason of the foregoing construction, the reel 11 may be employed for tape take-up in alternately inverted positions in a conventional manner by mechanically ancoring the lead end of a tape segment (not shown) by introduction thereof into the chamber 62 through the slot 65 or into the chamber 64 through the slot 67. Moreover, the foregoing arrangement adapts the slots as air transmission channels to aid in drawing tape against the hub 12 when their respective of chambers 62 and 64 are disposed in communicative connection with reel chamber 36 when air pressure is reduced therein.

The herein described construction allows a take-up reel to be used in each position of inversion, whether the inversion is by design or unintentional, for securing the lead end of a tape to the hub of such reel. Moreover, according to the present invention the same reel may be employed for tape take-up by anchoring to its hub the lead end of a tape either pneumatically or mechanically.

As many substitutions or changes could be made in the above described construction and as many apparently widely different embodiments of the invention within the scope of the claims could be constructed without departing from the scope and spirit thereof, it is intended that all matter contained in the accompanying specification shall be interpreted as being illustrative and not in a limiting sense.

The embodiments of the invention in which an exclusive property or privilege is claimed are defined as follows:

1. In a tape handling mechanism comprising a drivable tape take-up reel having a cavernous hub including groups of channels therein and adapted to have secured thereagainst a convolution of the lead end of a tape section to be wound about said reel, pneumatic means for reducing pressure within said hub to cause securance of the lead end of a tape section to the outer surface of said hub by external pressure, baffle means arranged within said hub for pneumatically selectively connecting the pneumatic means with alternate groups of the channels in said hub whereby the lead end of a tape section may be secured to said hub.

2. In a tape handling mechanism comprising a rotatable tape take-up reel having a hub with circumferentially disposed channels, said hub having therein a plurality of chambered sections in air transmission association with selected of said channels, pneumatic means for reducing pressure within alternately selected of said chambered sections to cause securance against the hub of a convolution of the lead end of a tape section by external pressure resulting from reduction in pressure in channels associated with the selected chamber section.

3. A tape handling mechanism as defined in claim 2 further characterized by reel support means defining an axis of rotation for said reel, said reel removably mounted on said reel support means, the chambered sections in said hubs being disposed longitudinally of said axis of rotation, the pneumatic means being in air transfer relationship with the chambered section disposed at a selected position longitudinally of said axis of rotation, whereby the lead end of a tape section can be held to said hub when said reel is alternately conditioned on said reel support means.

4. A tape handling mechanism as defined in claim 2 in which the reel is removably mounted on said tape handling mechanism, the chambered sections being lineally disposed, the pneumatic means being connected in air transfer relationship with the chambered section in predetermined relative lineal disposition whereby a tape section can be anchored about said hub when the reel is conditioned in alternate positions.

5. A tape handling mechanism as defined in claim 2 in which the chambered sections are invertibly arranged whereby the lead end of a tape section can be anchored about said hub when the reel is conditioned in each position of inversion.

6. A tape handling mechanism as defined in claim 5 in which the chambered sections comprise a pair of inversely symmetrical cells constructed for receiving one end of a tape section, said cells being communicatively connected to a pair of channels, respectively, said last mentioned channels being inversely symmetrical to each other and each thereof being proportioned for passage therethrough into a respective of said cells of the lead end of a tape section for mechanical securance thereof in inverse reel conditions.

7. A tape handling mechanism as defined in claim 1 in which said baffle means comprises a divider separating the space within said hub into a plurality of inversely symmetrical chambered sections pneumatically isolated from each other, each of said chambered sections associated in air transmission relationship with a portion of said channels, means for connecting said pneumatic means with selected of said chambered sections whereby upon hub inversion only alternate portions of said channels will be effective for securing a tape section on said hub.

8. A tape handling mechanism as defined in claim 7 in which the means for connecting the pneumatic means with selected of said chambered sections comprises a member having an annulus defining an opening in air transmission association with said pneumatic means, said hub defining an end opening for each of said chambered sections, said hub removably mounted on said tape handling mechanism and adapted for invertible disposition adjacent said annulus to alternately arrange the hub end openings and the opening in said member in air transmission relationship.

9. A tape handling mechanism as defined in claim 1 in which said baffle means comprises a plate dividing the space within said hub into a plurality of inversely symmetrical chambered sections, each of said chambered sections associated in air transmission relationship with a portion of said channels, whereby upon hub inversion only alternate portions of said channels will be effective for securing the lead end of a tape section to said hub.

10. A tape handling mechanism as defined in claim 9 in which the channels in said hub are disposed in spaced relationship circumferentially of said hub and extend transversely thereof, each of said channels opening to the hub exterior only a portion of said channels opening to each chambered section whereby upon hub inversion alternate channels will be effective for tape end securance.

11. In a drivable tape take-up reel having a channeled cavernous hub constructed to have the air pressure therein reduced for securance thereagainst of a convolution of the lead end of a tape section by extrenal pressure, an annulus defining said hub and having therein a slot proportioned for therethrough passing a tape, said hub having a cell in communicative connection with said slot and adapted to hold the lead end of a tape section, said cell adapted to have the air pressure therein reduced whereby the hub can hold the lead end of a tape section pneumatically and mechanically.

12. In a tape take-up reel having a hub with circumferentially extending channels, said hub having a chambered section pneumatically connected to said channels and constructed for reduction of pressure within said chambered section to cause securance against the hub of a convolution of the lead end of a tape by external pressure resulting from reduction in pressure in the channels, said chambered section comprising a cell adapted for receiving an end of a tape section and communicatively connected to one of said channels, said last mentioned channel adapted for passage into said cell of the lead end of a tape section for mechanical securance thereof in said hub.

13. In a drivable tape take-up reel having a cavernous hub including groups of channels therein and adapted to have secured thereagainst a convolution of the lead end of a tape section be wound about said reel, said reel being adapted to be placed in operative relation with a pneumatic means for reducing pressure within said hub to cause secureness of the lead end of a tape section to the outer surface of said hub by external pressure, baffle means arranged within said hub and including alternate groups of the channels in said hub arranged for selective engagement with said pneumatic means whereby the lead end of a tape section may be secured to said hub.

14. A tape take-up reel having a hub with circumferentially disposed channels, said hub having therein a plurality of chambered sections in air transmission association with selected of said channels, alternate groups of said chambered sections being adapted to be selectively engaged with a pneumatic means whereby to cause securance against the hub of a convolution of the lead end of a tape section by external pressure resulting from reduction in pressure in channels associated with the selected chamber sections.

References Cited

UNITED STATES PATENTS

| | | | |
|---|---|---|---|
| 1,629,154 | 5/1927 | Ybarrondo | 242—74 X |
| 3,127,122 | 3/1964 | Roshkind | 242—74 X |

FRANK J. COHEN, *Primary Examiner.*

N. L. MINTZ, *Assistant Examiner.*